Figure 1:
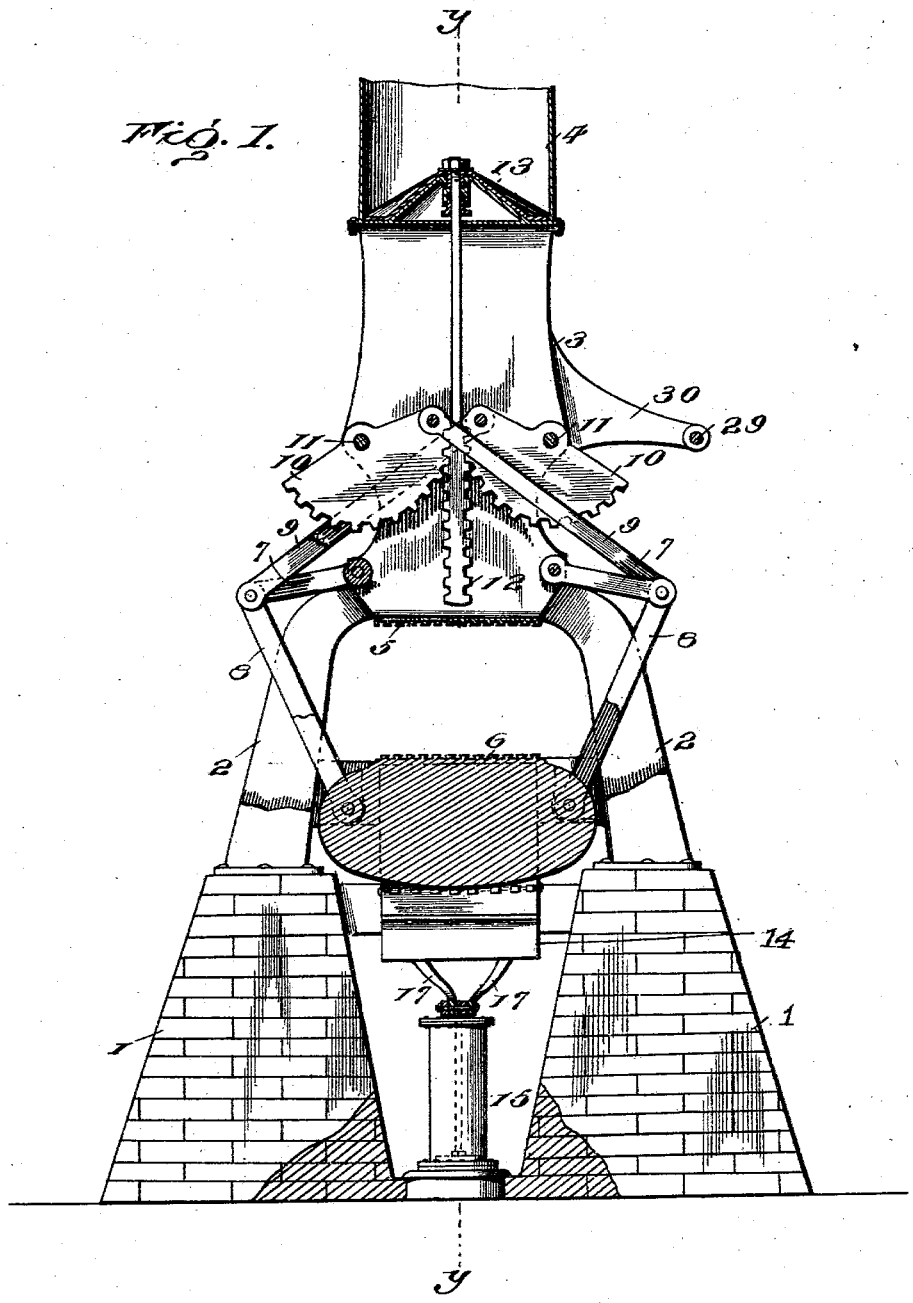

No. 739,838. PATENTED SEPT. 29, 1903.
R. D. CROW.
COTTON PRESS.
APPLICATION FILED JUNE 24, 1903.

NO MODEL. 4 SHEETS—SHEET 1.

WITNESSES INVENTOR
Robert Douglas Crow.
by
Attys.

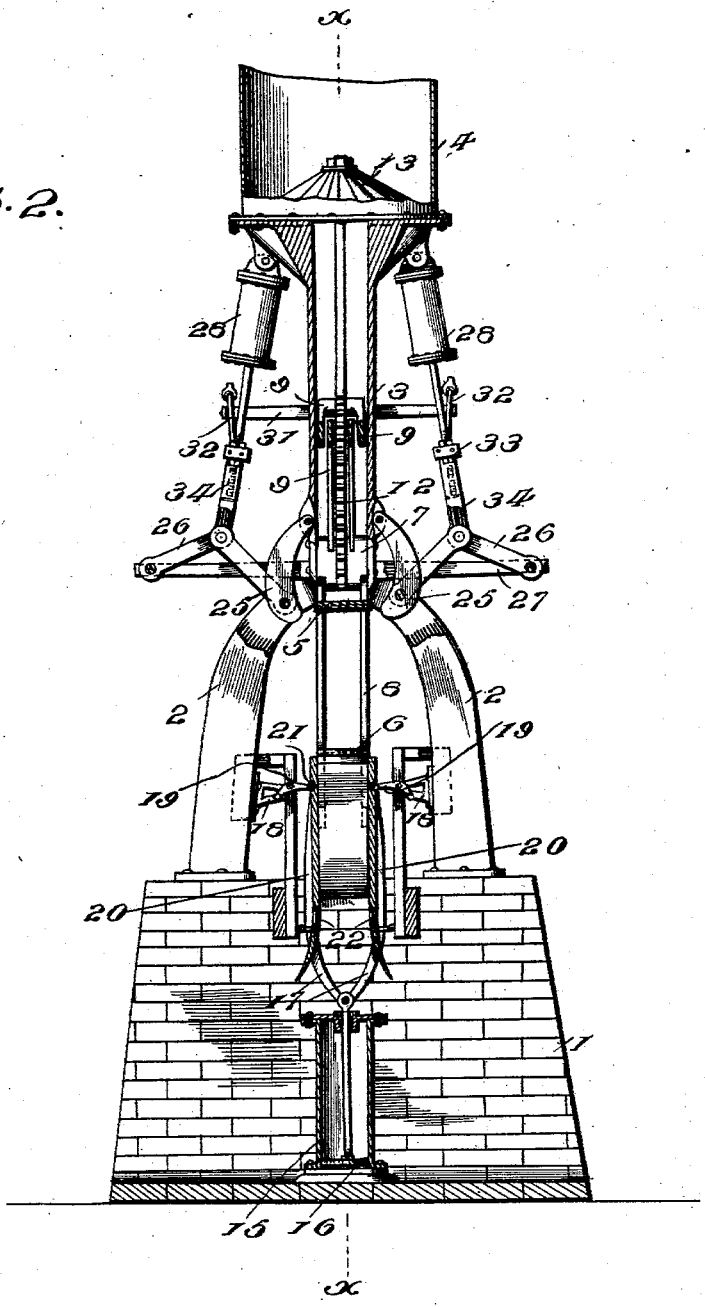

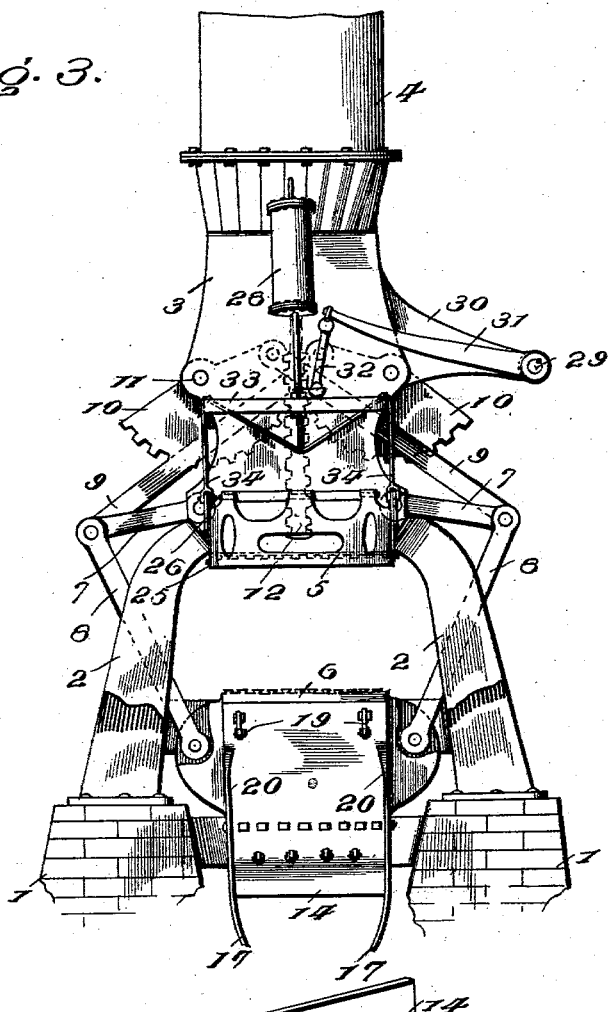

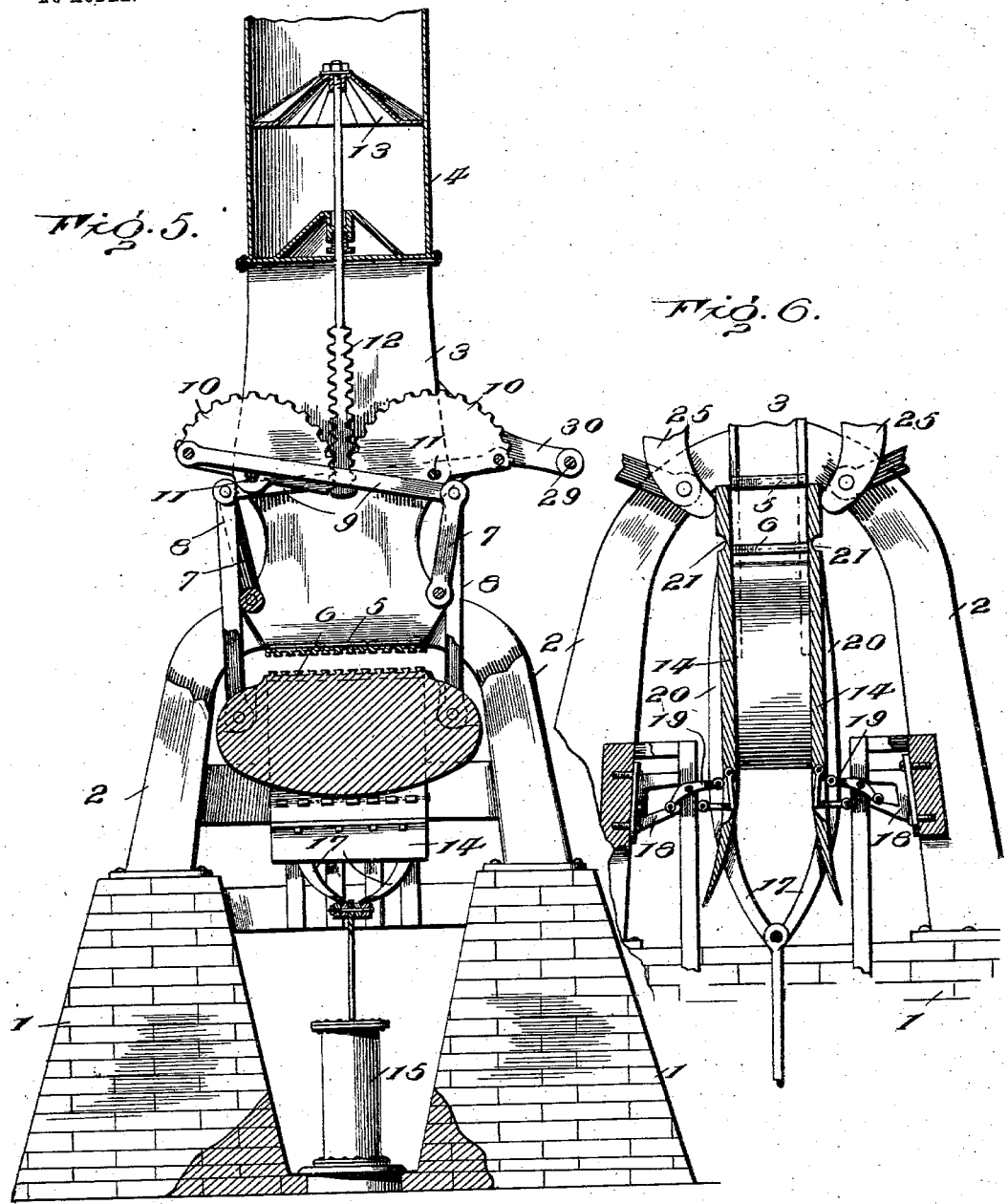

No. 739,838. Patented September 29, 1903.

UNITED STATES PATENT OFFICE.

ROBERT DOUGLAS CROW, OF HENDERSON, TEXAS.

COTTON-PRESS.

SPECIFICATION forming part of Letters Patent No. 739,838, dated September 29, 1903.

Application filed June 24, 1903. Serial No. 162,929. (No model.)

*To all whom it may concern:*

Be it known that I, ROBERT DOUGLAS CROW, a citizen of the United States, residing at Henderson, in the county of Rusk and State of Texas, have invented certain new and useful Improvements in Cotton-Presses, of which the following is a specification.

This invention has relation to the type of presses for condensing the cotton or material after the same has been baled, whereby the bale in its original form is first reduced in size by changing its shape without appreciably compressing or increasing its density, said bale in a subsequent and continuous operation being compressed to the required degree after its shape or form has been altered. The abutting or confining plates are mounted for vertical movement when sliding into or out of operative position and have a limited lateral play to admit of clearing opposite sides of the bale when moving upward into position, tension and confining means coöperating with the upper ends of the plates, whereby the bale has its form changed when pressing opposite sides together to reduce the area upon which the direct action of the compress elements expend their force.

Economy of space and simplicity of construction as well as efficiency in operation are controlling features in devising the compress forming the basis of this application.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a vertical central section of a compress embodying the invention, the lower cylinder being in full. Fig. 2 is a vertical section of the compress on the line Y Y of Fig. 1. Fig. 3 is a side view of the compress, the upper and lower portions being broken away. Fig. 4 is a detail perspective view of an abutting or confining plate. Fig. 5 is a view similar to Fig. 1, showing the relative position of the parts when the confining-plates and the lower platen are elevated. Fig. 6 is a view similar to Fig. 2, showing the parts on a larger scale and the confining-plates and platen elevated, the upper and lower portions of the press being omitted.

Corresponding and like parts are referred to in the following description and indicated in all the views of the drawings by the same reference characters.

The foundation may be of masonry, as indicated at 1, or of any substantial construction to form a firm support for the operating parts. Oppositely-disposed brackets 2 are secured to the foundation and support a frame 3, upon which is mounted engine or cylinder 4, by means of which movement is imparted to the compressing element by means of which the bale is condensed in the operation of the machine. In the construction illustrated the compressing elements or members comprise upper platen 5 and lower platen 6, the former being fixed, the latter movable.

Links 7 are pivoted at their inner ends to opposite sides of frame 3 near its lower end and extend laterally and downwardly in opposite directions. Links 8 are pivoted at their upper ends to the outer ends of links 7 and are downwardly converged and have pivotal connection at their lower ends to side extensions of the platen or movable bed-piece 6. Other links 9 are pivoted to the outer ends of links 7 and are upwardly converged and are pivotally connected at their upper ends to the inner upper ends of sections 10, pivoted to frame 3 at 11. Sectors 10 are toothed and intermesh with teeth at opposite sides of vertical rack-bar 12, forming a part of or applied to the piston-rod of the piston 13, arranged to operate in cylinder 4. When the platen or movable bed-piece 6 is at the limit of its downward movement, the power-transmitting connections occupy the position substantially as shown in Fig. 1, whereby they are perfectly responsive to upward travel of piston 13 when the motive fluid is supplied to the lower end of cylinder 4 by the usual instrumentalities commonly employed in mechanism of this type. As the piston 13 moves upward and the bale is compressed links 7 approach the perpendicular and their effective leverage increases in inverse ratio to the density or compression of the bale being acted upon. The upper ends of links 9 cross, and the link upon one side of the machine is pivoted to the sector 10 upon the opposite side of the machine, as shown most clearly in Fig. 1. Hence in operation links 9 are drawn laterally and upwardly by the action of the sectors, as will be readily comprehended. The opposing faces of the platens are grooved to admit of passage between them and the bale of binders for securing the bale after its form has been changed and said bale condensed to the predetermined size and density.

The abutting or confining plates 14 are located upon opposite sides of platen or movable bed 6 and are mounted for vertical sliding movement and to have a limited lateral play to admit of their clearing opposite sides of a wider bale when said plates are moving upward into position, so as to embrace opposite sides of the bale. Any suitable actuating means may be provided for effecting vertical movement of plates 14, and for convenience engine or cylinder 15, with piston 16, is illustrated, same being located in a pit or depression of the foundation. Upwardly-diverged links or frames 17 connect plates 14 with the upper end of the rod of piston 16 and are pivoted at their lower ends to said piston-rod to admit of lateral movement of the plates. Brackets 18 are secured to brackets 2 and pivotally support at their inner ends elbow-levers 19, having arms of unequal length provided at their ends with rollers to travel upon tracks 20, provided upon the outer side of plates 14. The upper arms of elbow-levers 19 are longer than the lower arms and bear against plates 14 and are adapted to assume a horizontal position and lock said plates after the latter have been moved upward and inward against the sides of the lower platen. (See Fig. 6.) These levers hold the plates 14 against the sides of the platen or bed-piece 6 during their descent and drop into depressions 21 with the upper ends of said plates when the latter reach the limit of their downward movement. When the plates 14 begin to move upward, the levers 19 are rocked upon their pivotal supports and release the said plates and admit of their moving outward by gravitative force, so as to clear the sides of the bale previously placed upon the platen 6 in position for compression. Plates 14 are carried upward by the action of motive medium upon piston 16 when admitted into the lower end of cylinder 15 by the usual mechanism. (Not shown.) The weight of the plates, piston 16, and connections is sufficient to return plates 14 to a normal position when the motive fluid is exhausted from cylinder 15.

Guards 22 are applied to the lower end of plates 14 and are pivoted thereto and normally incline inward, so as to touch opposite sides of platen or movable bed-piece 6 and prevent the covering or any portion of the bale being caught between said part 6 and the plates 14. Lugs 23 project outward from the lower edges of guards 22 and pass through slots or openings of plates 14 and are provided at their outer ends with rollers to travel upon vertical guides or tracks 24, so as to hold guards 22 in proper position to insure their lower ends touching opposite sides of part 6 irrespective of the relative position of plates 14. It must be remembered that plates 14 have a limited lateral play for the purpose herein stated, and if guards 22 moved laterally therewith a contingency would arise when guards 22 would not touch the sides of bed or platen 6; hence the necessity for the provision of vertical guides 24 and the pivotal connection of guards 22 with plates 14.

The upper ends of plates 14 are drawn together and secured by pivoted compressors 25, suspended from the lower portion of frame 3 and vertically curved, the lower ends of said compressors being adapted to engage with the upper ends of plates 14 and draw same inward preliminary to the action of the condensing or compress mechanism. Toggle-levers 26 connect the lower ends of compressors 25 with the outer ends of yoke 27 and are adapted to break joint upward when the lower ends of the compressors 25 are drawn outward. Engine-cylinders 28 are pivoted at their upper ends to frame 3, and their piston-rods are connected to the respective toggle-levers 26, so as to operate same to effect a lateral swinging of compressors 25 at their lower ends.

In the operation of the press the bale of cotton or like material to be condensed is placed upon the lower bed or platen 6, and the lower engine 15 is vitalized to effect vertical movement of plates 14, which in their ascent pass upward upon opposite sides of the bale. After the plates 14 have reached the limit of their upward movement engines 28 are vitalized to effect a straightening of the toggle-levers 26, whereby the lower ends of compressors 25 are moved inward, so as to draw the upper ends of plates 14 toward each other and secure same during the action of the compressing mechanism. After the plates 14 have been drawn inward and secured engine 4 is actuated to cause its piston and rod to move upward, whereby sectors 10 are turned upon their bearings 11 and draw links 7 upward and inward at their outer ends, whereby the lower platen or bed 6 is moved upward and the bale condensed to the requisite degree. The bale is bound or confined in the usual way and is released by operating compressors 25 to release plates 14, then bleeding engine 15 to permit descent of plates 14, and finally bleeding or exhausting engine 4. The bed or platen 6 is permitted to descend, when the completed bale may be removed in any convenient way.

The compressors 25 are caused to move in unison by the following means: A rock-shaft 29 is mounted in brackets 30, projected from the frame 3, and is provided at each end with an arm 31, connected by link 32 to the crosshead 33 of the frame 34, connecting the piston-rod with toggle-levers 26.

Having thus described the invention, what is claimed as new is—

1. In a press for changing the form of an ordinary bale and compressing the same, and in combination with the compressing members and actuating mechanism therefor, plates arranged upon opposite sides of the compressing mechanism, means for imparting a simultaneous rectilinear movement to the said plates either to project them across the space formed between the aforesaid compressing members to confine the bale upon two sides or to withdraw them from across said space to admit of removal of the bale when compressed and bound, and independent means for drawing the said plates together and holding them, substantially as and for the purpose specified.

2. In a press for changing the form of an ordinary bale and compressing same, and in combination with the compressing members and actuating means therefor, companion plates arranged upon opposite sides of the compressing mechanism and mounted for rectilinear sliding movement and limited lateral play, compressors arranged to engage with said plates, toggle-levers for actuating said compressors for forcing them inward to move said plates toward each other and to confine them, and actuating means for the toggle-levers, substantially as set forth.

3. In a press for changing the form of an ordinary bale and compressing same, and in combination with the compressing members and actuating means therefor, companion plates arranged upon opposite sides of the compressing mechanism and mounted for rectilinear sliding movement and limited lateral play, pivoted compressors arranged to engage with said plates to press them together and secure same, toggle-levers coöperating with the pivoted compressors, and actuating means for said toggle-levers, substantially as set forth.

4. In a press for changing the form of an ordinary bale and compressing same, and in combination with the compressing members and actuating means therefor, companion plates arranged upon opposite sides of the compressing mechanism and mounted for rectilinear sliding movement and limited lateral play, a yoke, pivoted compressors, toggle-levers connecting said pivoted compressors with the yoke, and actuating means for said toggle-levers, substantially as specified.

5. In a press for changing the form of an ordinary bale and compressing same, and in combination with the compressing members and actuating means therefor, companion plates arranged upon opposite sides of the compressing mechanism and mounted for rectilinear sliding movement and limited lateral play, frames applied to the outer side of said plates and having their lower ends converged, and an engine having the lower ends of said frames pivotally connected to the piston-rod of said engine, substantially as described.

6. In a press for changing the form of an ordinary bale and compressing same, and in combination with the compressing members and actuating means therefor, companion plates arranged upon opposite sides of the compressing mechanism and mounted for rectilinear sliding movement and limited lateral play, and elbow-levers arranged to coöperate with said plates, substantially as and for the purpose set forth.

7. In a press for changing the form of an ordinary bale and compressing same, and in combination with the compressing members and actuating means therefor, companion plates arranged upon opposite sides of the compressing mechanism and mounted for rectilinear sliding movement and limited lateral play, and elbow-levers having their arms of different length and arranged to coöperate with said plates, substantially as set forth.

8. In a press for changing the form of an ordinary bale and compressing same, and in combination with the compressing members and actuating means therefor, companion plates arranged upon opposite sides of the compressing mechanism and mounted for rectilinear sliding movement and limited lateral play and provided with depressions, and elbow-levers for coöperating with said plates and the depressions thereof, substantially as and for the purpose set forth.

9. In a press for changing the form of an ordinary bale and compressing same, and in combination with the compressing members and actuating means therefor, companion plates arranged upon opposite sides of the compressing mechanism and mounted for rectilinear sliding movement and limited lateral play, guards applied to the lower end portion of said plates, and means for holding said guards in proper position irrespective of the lateral play of the plates, substantially as described.

10. In a press for changing the form of an ordinary bale and compressing same, and in combination with the compressing members and actuating means therefor, companion plates arranged upon opposite sides of the compressing mechanism and mounted for rectilinear sliding movement and limited lateral play, guards applied to the lower end portion of the plates and having loose connection therewith, and guides for directing the guards and insuring proper operation thereof, substantially as specified.

11. In a press for changing the form of an ordinary bale and compressing same, and in combination with the compressing members and actuating means therefor, companion plates arranged upon opposite sides of the compressing mechanism and mounted for rectilinear sliding movement and limited lateral play, guards applied to the lower end portion of said plates and having outer extensions passed through openings of the plates, and guides for coöperation with the extensions of the guards, substantially as described.

12. In a press for changing the form of an ordinary bale and compressing same, and in combination with the compressing members and actuating means therefor, companion plates arranged upon opposite sides of the compressing mechanism and mounted for rectilinear sliding movement and limited lateral play, guards pivoted to the lower portion of the plates and inclined inward and having outer extensions passed through openings of the plates, and guides for coöperation with the extensions of the guards, substantially as specified.

13. In a press, and in combination with the movable bed or platen, laterally-disposed links oppositely inclined, other links connecting the outer ends of the inclined links with the movable compressing element, sectors, links connecting the inner upper corners of the sectors with the outer ends of the aforementioned inclined links and crossing at a point between their ends, and actuating means for said sectors, substantially as set forth.

In testimony whereof I affix my signature in presence of two witnesses.

ROBERT DOUGLAS CROW. [L. S.]

Witnesses:
A. W. PARSONS,
THOMAS CONYNGTON.